United States Patent
Seko et al.

(10) Patent No.: US 6,331,224 B1
(45) Date of Patent: Dec. 18, 2001

(54) METHOD FOR MANUFACTURING CARBON SHEET

(75) Inventors: Hideo Seko, Gifu-ken; Hikaru Okamoto; Masami Ishii, both of Aichi-ken, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/383,195

(22) Filed: Aug. 26, 1999

(30) Foreign Application Priority Data

Aug. 26, 1998 (JP) ................................. 10-240743
Aug. 26, 1998 (JP) ................................. 10-240745
Jul. 28, 1999 (JP) ................................. 11-213508

(51) Int. Cl.[7] .............................. D01F 9/12; H01M 4/88; H01M 4/96

(52) U.S. Cl. .................. 156/181; 423/447.1; 423/447.7; 429/40; 429/44

(58) Field of Search .................. 156/176, 181; 264/105, 29.1; 423/447.1, 447.7; 429/213, 217, 231.8, 40, 42, 44; 162/138, 141, 146, 157.1

(56) References Cited

U.S. PATENT DOCUMENTS 4,547,418 * 10/1985 Shigeta et al. ................ 428/167
4,619,796 * 10/1986 Awata et al. ................... 264/29.4
5,648,027 * 7/1997 Tajiri et al. .................... 264/43

FOREIGN PATENT DOCUMENTS

| 05024950 | * 2/1993 | (JP) . |
| 7-130374 | 5/1995 | (JP) . |
| 8-2979 | 1/1996 | (JP) . |
| 8-106915 | 4/1996 | (JP) . |
| 10-270052 | 10/1998 | (JP) . |

* cited by examiner

Primary Examiner—Michael W. Ball
Assistant Examiner—Todd J. Kilkenny
(74) Attorney, Agent, or Firm—Oblon, Spivak, McClelland, Maier & Neustadt, P.C.

(57) ABSTRACT

A method for manufacturing a carbon sheet, particularly for an electrode of a fuel cell, includes the steps of forming a sheet by mixing carbon fibers and a bonding agent; drying the formed sheet; immersing the dried formed sheet in a water repellent material particle dispersed dilute solution; removing the formed sheet from the water repel material particle dispersed dilute solution; baking the formed sheet for fixing water repel material particles thereon contained in the water repel material particle dispersed dilute solution; and oxidizing the bonding agent for removing the same from the formed sheet during the baking.

15 Claims, 7 Drawing Sheets

FIG.3

| | Concentration of PTFE Dispersed Solution (wt%) | Carried Amount of PTFE (wt%) | Electric Resistance (mΩ) |
|---|---|---|---|
| Oxygen Electrode — 2nd Embodiment | 8 | 78.7 | 1.2 |
| Oxygen Electrode — 2nd Comparative Example | 8 | 12.0 | 1.5 |
| Oxygen Electrode — 3rd Comparative Example | 8 | 14.6 | 2.4 |
| Fuel Electrode — 2nd Embodiment | 20 | 165.3 | 1.7 |
| Fuel Electrode — 2nd Comparative Example | 20 | 36.1 | 2.8 |
| Fuel Electrode — 3rd Comparative Example | 20 | 40.0 | 3.9 |

FIG.4

| | | Concentration of PTFE Dispersed Solution (wt%) | Carried Amount of PTFE (wt%) | Water Repel Durability (days) |
|---|---|---|---|---|
| Fuel Electrode | 2nd Embodiment | 20 | 165.3 | >7 |
| | 2nd Comparative Example | 20 | 36.1 | 1 |
| | 3nd Comparative Example | 20 | 40.0 | 5 |

FIG.5

| Durability Test Hours | 0 | 100 | 500 |
|---|---|---|---|
| 2$^{nd}$ Embodiment | 0.65±0.01V | 0.65±0.01V | 0.64±0.01V |
| 2$^{nd}$ Comparative Example | 0.65±0.01V | 0.58±0.03V | 0.42±0.05V |
| 3$^{nd}$ Comparative Example | 0.64±0.01V | 0.62±0.02V | 0.59±0.03V |

METHOD FOR MANUFACTURING CARBON SHEET

BACKGROUND OF THE INVENTION

1. Field of the Invention

The present invention is directed to a method for manufacturing a carbon sheet and in particular to a method for manufacturing a carbon sheet which is used as a raw material of an electrode for a fuel cell. The present application is based upon Japanese patent applications 10-240743, 10-270745 and 11-213508, all of which are hereby incorporated by reference into the present application.

2. Description of the Related Art

In general, a fuel cell includes many cells arranged in a layered configuration. Each cell is a membrane electrode assembly (hereinafter referred to simply as an 'MEA') and includes an ion exchange membrane interposed between two porous, electrically conductive substrates, i.e. a fuel electrode and an oxygen electrode.

At the fuel electrode, when being provided with a fuel gas which contains therein as its main component hydrogen, the following reaction occurs.

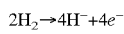

The resultant hydrogen ions ($4H^-$) pass through the ion exchange membrane to arrive at the oxygen electrode to which oxygen is provided. The electrons ($4e^-$) produced by the foregoing reaction arrive at the oxygen electrode by way of a connector wire. As a result, at the oxygen electrode, the following reaction occurs.

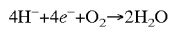

Thus, this fuel cell functions as a battery because it produces electrons to generate an electric current. Due to the fact that the foregoing electric current generation is based on the reverse mode of the electrolyzing water, which exhausts no substances except for water in liquid phase, such an electric current generator has become attractive as a clean or nonpolluting generator.

In order to reduce air pollution, the widespread use of electrically operated vehicles which mount fuel cells is desired. However, this desire has not been attained. The main reason is that the production cost of the fuel cells, per se, is too high. In light of the fact that most of the production cost of the fuel cells is represented by the production cost of the electrodes, it is very important to realize a cost reduction for the electrodes.

A conventional fuel or oxygen electrode is in the form of a catalyst carrying carbon sheet which is obtained by applying a catalyst on a water repellant treated carbon paper. Such a carbon sheet must be high in gas permeability, excellent in electric conductivity, high in water repellence, thermally and chemically stable, and low in production cost.

The production of water at the oxygen electrode may cause a problem if too much water accumulates in an oxidant flow path. If the oxidant stream becomes saturated, two phase flow may occur. That is, the oxidant flow stream may contain both water vapor and liquid droplets. Liquid water in the oxidant flow can flood the porous electrode and obstruct the oxidant from reaching the catalyst on the oxygen electrode.

In order to solve such a 'flood' problem, it is effective, as well known, to quickly discharge the generated water by keeping the electrode wet. On the basis of this concept, Japanese Patent Laid-Open Print No. Hei. 7(1995)-13 0374 provides an electrode, in the form of a catalyst carried carbon sheet, for a solid high molecular electrolysis type fuel cell. This electrode is obtained by the steps of immersing a commercially available carbon paper having a porosity of 80% in a liquid in which polytetrafluoroethylene family particles are dispersed, removing the carbon paper from the liquid, and baking the carbon paper.

However, in the commercially available carbon paper, carbon fibers, after being coupled with a thermosetting resin, are hot pressed under ambient conditions at a temperature of not less than 1000° Celsius, which results in high production costs. Thus, a fuel cell employing such an electrode becomes high in cost and is difficult to be put into practical use.

Alternatively, in Japanese Patent Laid-Open Print No. Hei. 10(1998)-270052, an outer surface of a substrate of an electrode is coated with a water-repellent material by exposing the substrate to fluorocarbon gas which is activated by a plasma treatment. However, employing such a method requires specially designed, large scale equipment or a similar facility, which means that such an electrode is not suitable for mass production and is not acceptable from a cost viewpoint.

SUMMARY OF THE INVENTION

It is, therefore, a principal object of the present invention to provide a carbon sheet at a lesser cost, which is of high durability and water repellant.

Another object of the present invention is to provide a manufacturing method of an electrode using such a carbon sheet.

In order to attain the foregoing and other objects, the present invention provides a method for manufacturing a carbon sheet, including the steps of forming a sheet by mixing carbon fibers and an bonding agent; drying the formed sheet; immersing the dried formed sheet in a water repellent material particle dispersed dilute solution; removing the formed sheet from the water repellent material particle dispersed dilute solution; baking the formed sheet for fixing the water repellent material particles thereon and contained in the water repellent material particle dispersed dilute solution; and oxidizing the bonding agent for removing the same from the formed sheet during the baking step.

BRIEF DESCRIPTION OF THE DRAWINGS

These and other features and advantages of the present invention will be more readily apprehended from the following detailed description when read in connection with the appended drawings, which form a part of this original disclosure, and wherein:

FIG. 3 is a Table showing a carried amount of PTFE and an electric resistance of each carbon sheet;

FIG. 4 is a Table showing test results of water repellence durability;

FIG. 5 is a Table showing test results of the durability of each fuel cell;

DETAILED DESCRIPTION OF THE PREFERRED EMBODIMENTS

[First Embodiment]

[Forming an Oxygen Electrode]

Figure 1:
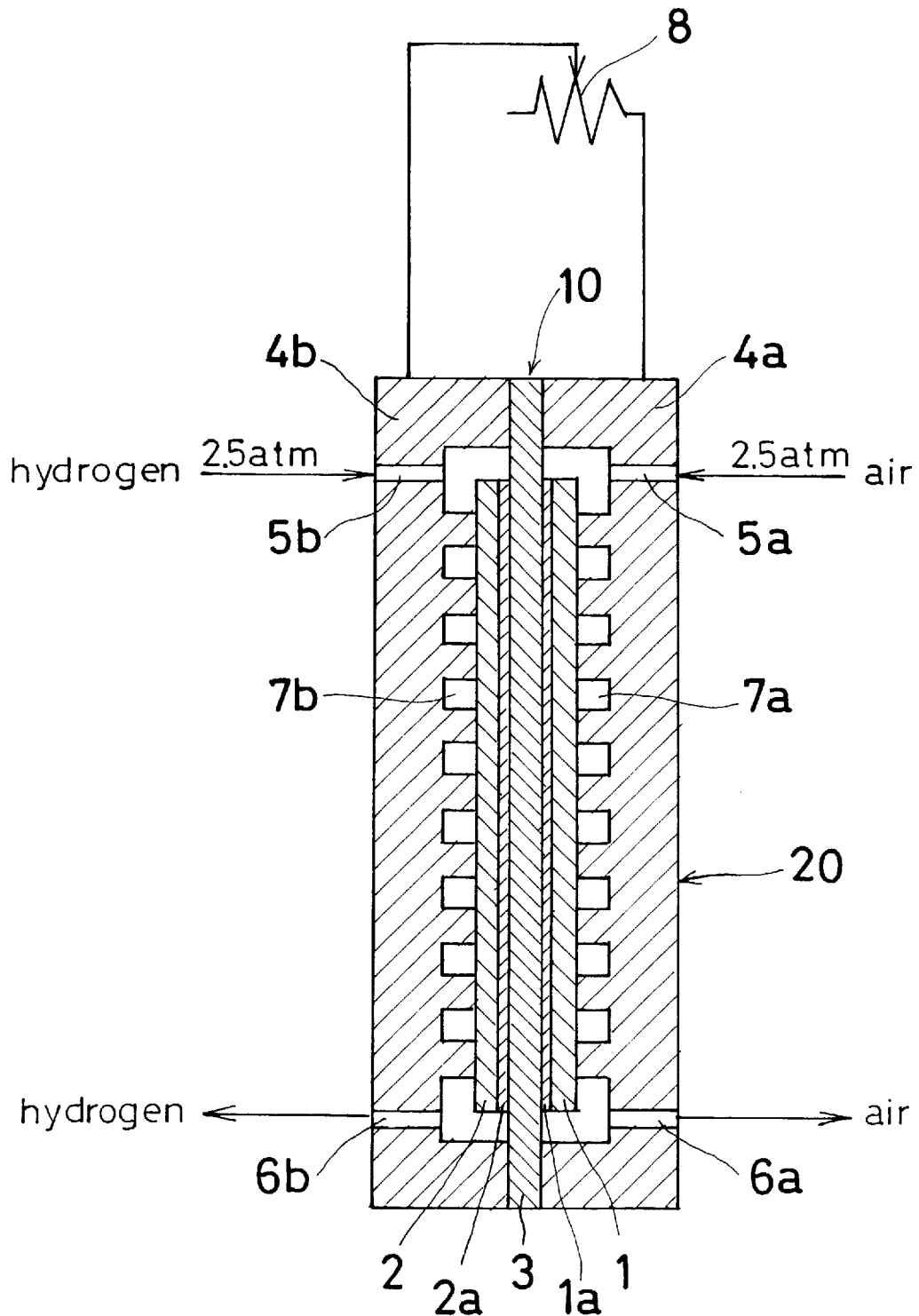
FIG. 1 is a cross-sectional view of a fuel cell, including electrodes employing carbon sheets, respectively, according to a first embodiment of the present invention.

A slurry for paper making is made by dispersing carbon fiber filaments, each of which is typically of a diameter of 13 μm and a length of 3 mm, and a pulp in water at a ratio of 1:1 by weight. The slurry is formed into a sheet by a method which is similar to manufacturing paper. Then the resultant formed sheet is cut to prepare an electrode substrate sheet having dimensions of 160 mm×160 mm.

Such an electrode substrate sheet is immersed for 2 minutes in a PTFE particle dispersed dilute solution which is formed by diluting a PTFE particle dispersed liquid with an amount of water such that the consistency of the PTFE particles becomes 20 weight percent. Due to the porosity of the electrode substrate sheet, the PTFE particles dispersed in the dilute solution are absorbed and impregnated in the electrode substrate sheet. It is to be noted that the PTFE particle dispersed liquid contains PTFE particles at 60 wt. % and is provided by Daikin Kogyo Co. Ltd. under the grade name of D-1.

The electrode substrate sheet is then dried by placing the same in ambient air of about 80° C. Thereafter, the resultant electrode substrate sheet is held in ambient air of 390° C. for 60 minutes, whereby the PTFE particles are fixed on surfaces of the carbon fibers and concurrently the pulp contained in the electrode substrate sheet is removed by oxidizing and gasifying. Thus a water repellent material carrying carbon sheet is obtained.

The PTFE is used to provide a water repellent function for the electrode substrate sheet and acts as a bonding agent for bonding carbon fibers together instead of to the removed pulp. Thus, the shape of the carbon sheet can remain unchanged.

The permeability of the carbon sheet was tested, according to the relevant JIS (Japanese Industrial Standard), by measuring a lapsed time for the expulsion of 300 cc of air in a cylinder having a bore of 10 cm. The result was 0.8 seconds, which reveals the excellent permeability of the electrode substrate sheet. The removal of the pulp leaves holes which act as gas expulsion passages, thereby increasing the permeability of the electrode substrate sheet. In brief, the pulp acts as hole making means in addition to a bonding means.

An experiment was made for measuring the electrical resistance of the carbon sheet sandwiched between cooper electrodes, each of which was of 35.7 mm diameter and 10 $cm^2$ in area, and tightened thereto by bolts at a torque of 20 $kgf/cm^2$. The result was 3.2 mΩ.

A paste is made by mixing carbon black particles and an ethylene glycol. The paste is screen printed on the carbon sheet for being impregnated therein. The resultant paste is removed by evaporating the ethylene glycol while the carbon sheet is placed within a vacuum at 80° C. for 2 hours. The resultant carbon sheet or the carbon sheet with carbon black particles impregnated is immersed again for 2 minuets in the foregoing PTFE particle dispersed dilute solution, and thereafter dried by placing the same in an ambient air of about 80° C. Thereafter, the resultant carbon sheet is held in an ambient air of 390° C. for 60 minutes, whereby the PTFE particles are fixed on the surfaces of the carbon fibers and the carbon black.

Next, a catalyst paste is made by mixing thoroughly a platinum carrying carbon which contains 40 wt % of platinum, water, an ion exchange solution provided by Asai Kasei Co. Ltd under the name of Ashiplex solution SS-1080, and an isopropyl alcohol at a weight ratio of 1:1.5:1.5:1.5, and is applied on an entire surface of one side of the carbon sheet with a thickness of about 300 μm according to Doctor bleed method. The resulting carbon sheet is dried to remove the isopropyl alcohol, thereby producing an oxygen electrode. The amount of the platinum carried on the oxygen electrode is about 0.4 mg per unit area ($cm^2$) of the oxygen electrode.

[Forming a Fuel Electrode]

Through a similar method for forming the oxygen electrode, a fuel electrode is produced except that PTFE immersing step is performed twice and a platinum-ruthenium carrying carbon is used instead of the platinum carrying carbon. One side of the carbon sheet of the fuel electrode is coated with platinum-ruthenium carrying carbon as a catalyst. The amount of the platinum carried on the fuel electrode is about 0.3 mg per unit area ($cm^2$) of the fuel electrode.

The reason why the oxygen electrode is made differently from the fuel electrode is due to water behavior in the fuel cell. In detail, when the fuel cell operates, water has to be supplied to both electrodes, and therefore to avoid flooding of the catalysts of the respective electrodes, each of the electrodes must be water repellent. However, at the stable stage of the fuel cell, the oxygen electrode must still be water repellent due to water generation by the chemical reaction, while the carbon black near the catalyst of the fuel electrode has to be hydrophilic in light of the fact the hydrogen ions generated at the fuel electrode have to move through water.

Comparative Example 1

[Forming an Oxygen Electrode]

An electrode substrate sheet is prepared by cutting a carbon paper having a thickness of 0.23 mm (provided by Toray under the designation TGP-H-060) into a 160 mm×160 mm configuration and a carbon sheet is obtained through a PTFE impregnation process similar to that in the Example 1. The permeability and electric resistance of this carbon sheet were found to be 3.7 sec and 3.4Ω, which are inferior to those of Example 1. The test methods and conditions were identical for this carbon paper and that in Example 1.

Similar to the method in Example 1, an oxygen electrode is produced by applying a platinum carried carbon having a thickness of about 300 μm on the entire surface of this carbon sheet. The amount of the platinum carried on the oxygen electrode is about 0.4 mg per unit area ($cm^2$) of the oxygen electrode.

[Forming a Fuel Electrode]

A fuel electrode is produced by a method similar to the oxygen electrode producing method except that a platinum-ruthenium carrying carbon is used instead of the platinum carrying carbon. The amount of the platinum carried on the fuel electrode is about 0.3 mg per unit area ($cm^2$) of the fuel electrode.

[Evaluation Method 1]

In FIG. 1, there is illustrated a cross-section of the structure of a single cell 20 used for testing electrodes. The cell 20 includes a membrane electrode assembly (hereinafter referred simply as 'MEA') 10 which has an ion exchange membrane 3 interposed between an oxygen electrode 1 and a fuel electrode 2. The MEA is constructed by sandwiching the membrane 3 between the electrodes 1 and 2 such that a catalyst layer 1a of the oxygen electrode 1 and a catalyst layer 2a of the fuel electrode 2 face opposite surfaces of the membrane 1. The resulting structure is brought into a hot press and is being held for 3 minutes under a holding pressure of 80 kg/cm², at a temperature of 160° C., thereby producing the MEA 10. The MEA 10 is held between a separator 4a having an air inlet port 5a, an air flow channel 7a and an air outlet port 6a, and another separator 4b having a hydrogen inlet port 5b, a hydrogen flow channel 5b and a hydrogen outlet 6b, thereby producing the cell 20.

Air under a pressure of 2.5 atm is applied to the oxygen electrode 1 by way of the air inlet 5a and the air flow channel 5b, while hydrogen under a pressure of 2.5 atm is applied to the hydrogen electrode 2 by way of the hydrogen inlet 5b and the hydrogen flow channel 7b. Each of the air and hydrogen has been humidified by the bubbling method.

A variable resistor 8 is provided between the separators 4a and 4b. For evaluation of the MEA of the First Embodiment and of the First Comparative Example, the generated or cell voltage and electric density are measured plural times by varying the resistance value of the resistor 8.

[Comparison Result 1]

Figure 2:
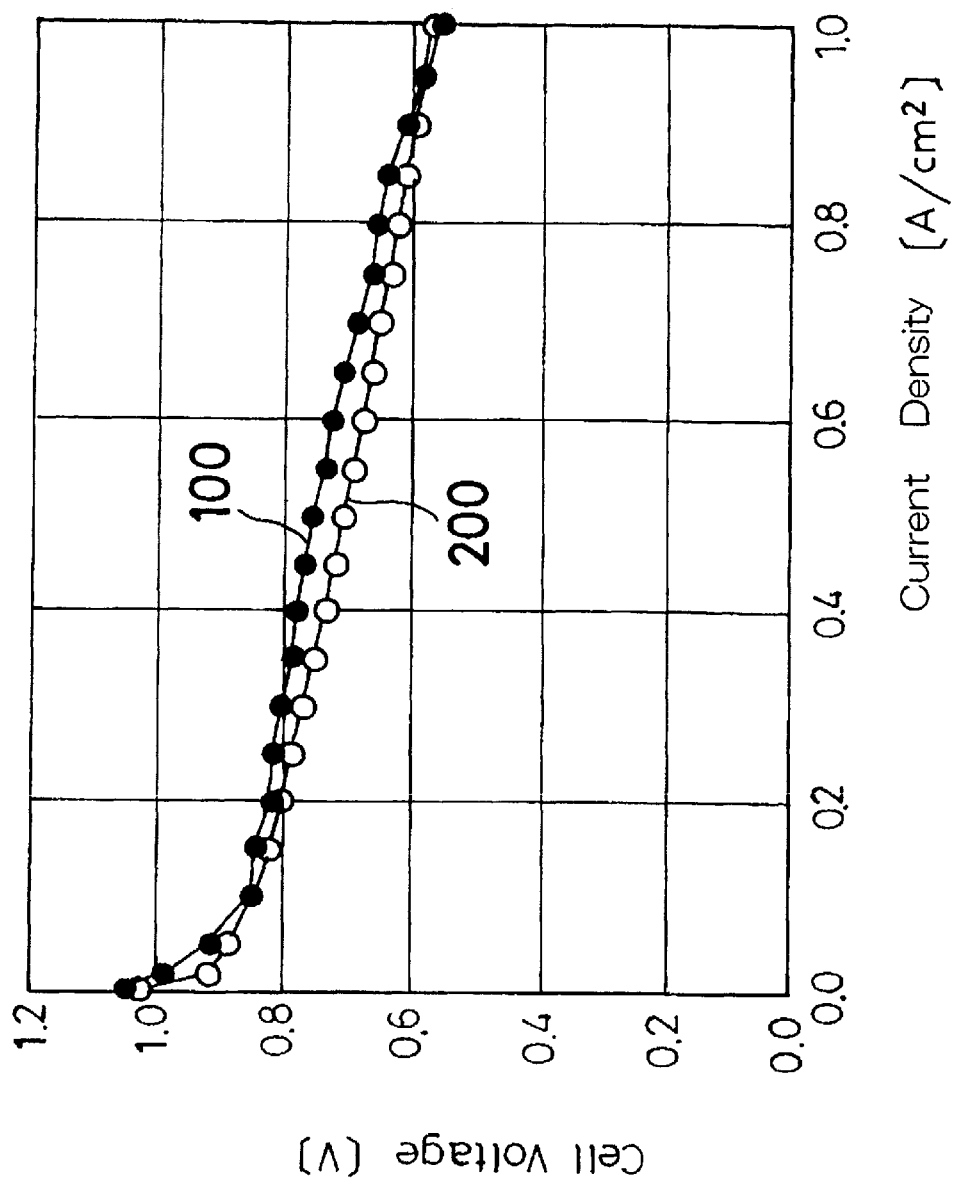
FIG. 2 is a graph showing test results of the first embodiment and a first comparative example.

The evaluation results of the First Embodiment and the First Comparative Example are shown in a graph in FIG. 2. In this graph, the horizontal coordinate denotes current density, the vertical coordinate denotes cell voltage, the reference numeral 100 denotes the evaluation results of the First Embodiment, and the reference numeral 200 denotes the evaluation results of the First Comparative Example. As apparent from this graph, the First Embodiment and the First Comparative Example are similar in characteristics.

In the foregoing embodiment, an inorganic family dispersant or other inorganic bonding agent can be added to the slurry, together with the fiber such as the pulp. As to sheet formation, the non-woven fabric formation method and Doctor's bleed method wherein the slurry contains carbon fibers and a bonding agent are available.

Instead of the pulp as the material for absorbing dispersant, if the dispersing medium is water based, a water absorption resin such as polyacrylic acid resin, polyvinyl alcohol resin or polyacryl amid resin is available, and if the dispersing medium is oily, a oil absorption resin such as alkyl styrene or alkyl methacrylate is available.

[Second Embodiment]

[Forming an Oxygen Electrode]

A slurry for paper making is made by dispersing carbon fiber filaments, each of which is typically of a diameter of 14.5 μm and a length of 6 mm, and a pulp as a material for absorbing dispersant, in a water at a ratio of 4:6 by weight. The slurry is formed into a sheet having a thickness of about 0.3 mm by method which is similar to that of manufacturing paper. Then, the resultant formed sheet is cut to prepare an electrode substrate sheet having dimensions of 160 mm×160 mm.

The electrode substrate sheet is immersed for 2 minutes in a PTFE particle dispersed dilute solution which is formed by diluting a PTFE particle dispersed dilute with an amount of water such that the consistency of the PTFE particle becomes 20 weight percent. Due to the porosity of the electrode substrate sheet, the PTFE particle dispersed dilute solution is absorbed and impregnated in the electrode substrate sheet. It is to be noted that the PTFE particle dispersed liquid contains PTFE particles by 60 wt % and is provided by Daikin Kogyo Co. Ltd. under the grade name of D-1.

The electrode substrate sheet is dried by placing the same in ambient air of about 80° C. Thereafter, the resultant electrode substrate sheet is held for 60 minutes in ambient air of 390° C., whereby the PTFE particles are fixed on surfaces of the carbon fibers and concurrently the pulp contained in the electrode substrate sheet is removed by oxidizing and gasifying. Thus a water repellent material carried carbon sheet is obtained.

The PTFE is used to provide a water repelling function for the electrode substrate sheet and acts as a bonding agent for bonding carbon fibers together instead of to the removed or expelled pulp. Thus the shape of the carbon sheet can remain unchanged.

Similar to the First Embodiment, the carbon sheet is formed ultimately into a platinum carrying oxygen electrode. The amount of the platinum carried on the oxygen electrode is about 0.4 mg per unit area (cm²) of the oxygen electrode.

[Forming a Fuel Electrode]

A fuel electrode is produced which is identical with that of the First Embodiment. except that the PTFE particle dispersed liquid contains PTFE particles of 20 wt %. The amount of the platinum carried on the fuel electrode is about 0.3 mg per unit area (cm²) of the fuel electrode.

Comparative Example 2

Oxygen electrode and fuel electrodes are produced so as to be identical with those of the Second Embodiment in structure and production method except that each carbon paper has a thickness of 0.23 mm (provided by Toray under the designation TGP-H-060).

Comparative Example 3

Oxygen and fuel electrodes are produced so as to be identical with those of the Second Embodiment in structure and production method except that each carbon paper has a thickness of 0.23 mm (provided by Nihon Carbon under the designation P-7).

[Evaluation Method 2]

An evaluation was made on the basis of measuring the carried amount of water repellent material on the carbon sheet, measuring electric resistance of the carbon sheet, measuring the durability of the water repellent function of the carbon sheet and measuring durability of the MEA.

Measuring the carried amount of water repellent material on the carbon sheet is made by determining the weight percent of the PTFE as the water repellent material relative to the carbon fiber in the carbon sheet. Measuring electric resistance of the carbon sheet is done by cutting the carbon sheet into a square of 35.7×35.7 mm, holding the resultant carbon sheet between a pair of identical cooper plates under a pressure of 40 kgf /cm², and applying an electric current across the resulting structure. Measuring durability of the water repelling function of the carbon sheet is done by floating the carbon sheet on water at a temperature of 80° C. in stable manner, and determining a time duration until the carbon sheet begins to sink in the water.

Measuring the durability of the MEA is done in a way similar to that in Evaluation 1. That is, the MEA is produced and pure oxygen under a pressure of 1.1 atm and pure hydrogen under a pressure of 1.1 atm are applied to the oxygen electrode and the fuel electrode, respectively. The degree of utilization of the oxygen and that of the hydrogen are 80% and 80%, respectively. To wet the membrane 3 prior to such applications of the oxygen and hydrogen, the oxygen and the hydrogen are passed through water at a temperature of 50° C. and water at a temperature of 70° C., respectively. The temperature of the MEA is kept at 80° C. Under these conditions, a voltage across the separators 4a and 4b and a current therethrough are detected. The evaluation is based on monitoring changes in the cell voltage with the passing of time, subject to setting the current density at a constant value of 0.75 cm².

[Evaluation Result 2]

Table 1 shown in FIG. 3 reveals that the carbon sheet of the oxygen electrode (fuel electrode) of the Second Embodiment is much higher than that of each of the second and third comparative examples in the carried amount of PTFE or water repellent material. More than 160 wt % of the PTFE can be carried on the carbon fiber. Despite the larger carried amount of PTFE or water repellent material on the carbon sheet of each of the electrodes in the Second Embodiment, the electric resistance of the carbon sheet of the Second Embodiment is smaller than that of the carbon sheet of each of the second and third comparative examples.

When the electrode substrate sheet is immersed in the PTFE particle dispersed dilute solution, the pulp absorbs the water as the dispersant for the PTFE particle dispersed liquid. Together with this water, the PTFE particles adhere to the pulp. Upon baking the electrode substrate sheet at a temperature of 390° C., the pulp is gasified, oxidized, and removed. Simultaneously, the PTFE particles are melted, thereby acting as a bonding agent for bonding the carbon fibers. Thus, the PTFE particles are especially carried in the spaces which the pulp occupied and the matrix structure of carbon fiber can be maintained, by which the mutual engagement between carbon fibers remains unchanged and the electric resistance does not increase. Thus, the carbon sheet becomes excellent in electric conductivity.

According to Table 2 shown in FIG. 4 which reveals the durability of the water repellence function of each of the carbon sheets, the carbon sheets of the oxygen and fuel electrodes of each of the Second and the Third Comparative Examples sink into the water within 5 days, whereas even after the lapse of 7 days the carbon sheets of the oxygen and fuel electrodes of the Second Embodiment are still floating on the water. It may be understood that the foregoing difference in durability results from the difference between the carbon sheet of the oxygen electrode (fuel electrode) of the Second Embodiment and each of the second and third comparative examples in the carried amount of PTFE or water repellent material.

Table 3 shown in FIG. 5 indicates the measured cell voltage of the Second Embodiment, the Second Comparative Example, and the Third Comparative Example. Measuring the voltage across the separators 4a and 4b is made by setting the current density at a constant value of 0.75 A/cm² for a time duration of 3 hours, beginning at 100 hours, and again at 500 hours, from the initiation of operation of the cell. The cell voltage of the Second Embodiment remained substantially unchanged. The fluctuation of the measured cell voltage is very small. However, the cell voltage of each of the Second Comparative Example and the Third Comparative Example dropped during the measurement and fluctuated considerably. This may be due to the lesser or poor water repellent function of each of the Second Comparative Example and the Third Comparative Example.

It is to be noted that the foregoing carbon sheet with excellent porous function can also be used as an electrostatic filter for air cleaners, a corrosion-resistant filters, or a collector for Ni—MH electrodes.

[Third Embodiment]

Figure 6:
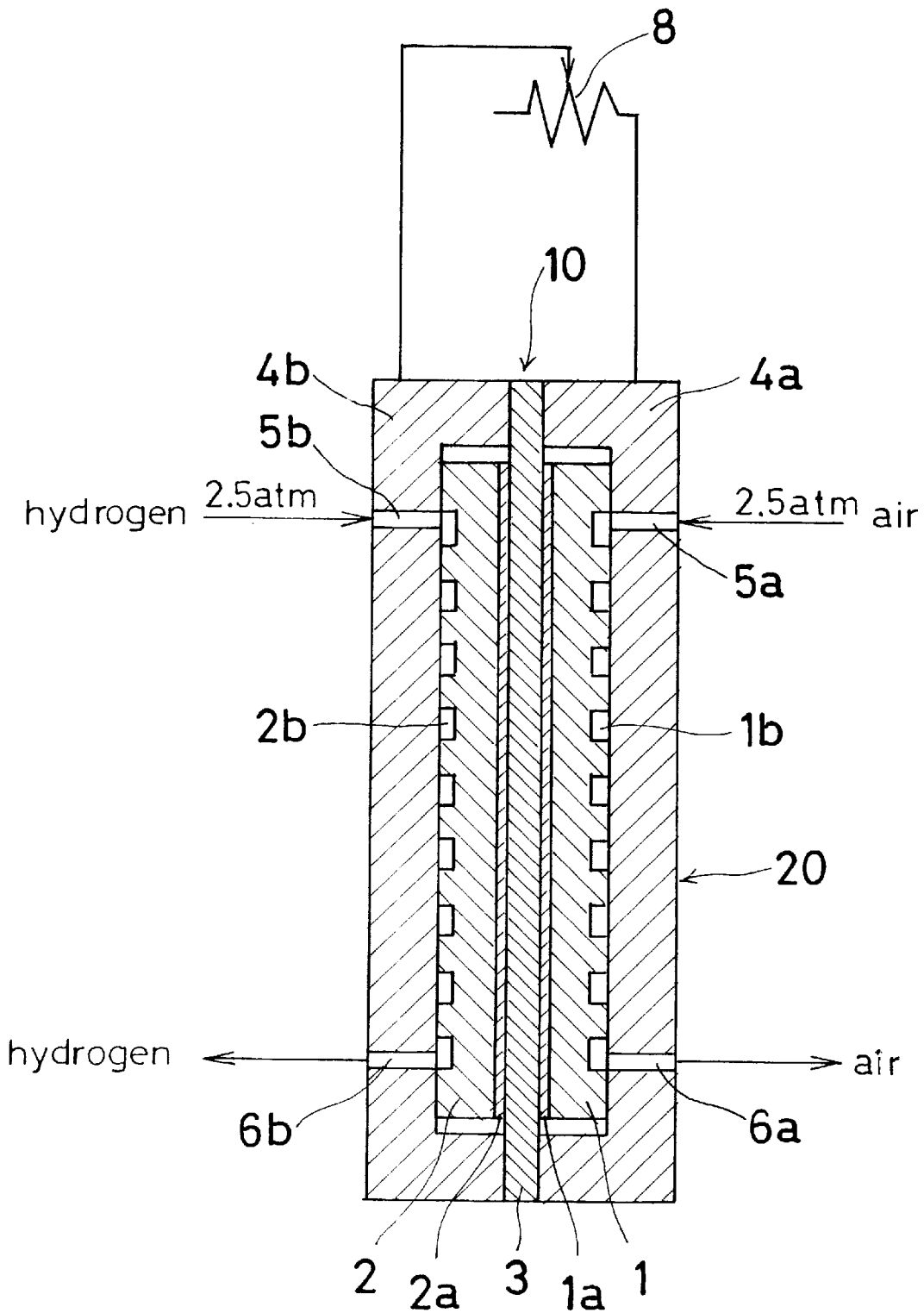
FIG. 6 is cross-sectional view of a fuel cell including electrodes employing carbon sheets, respectively, according to a second embodiment of the present invention.
Figure 7:
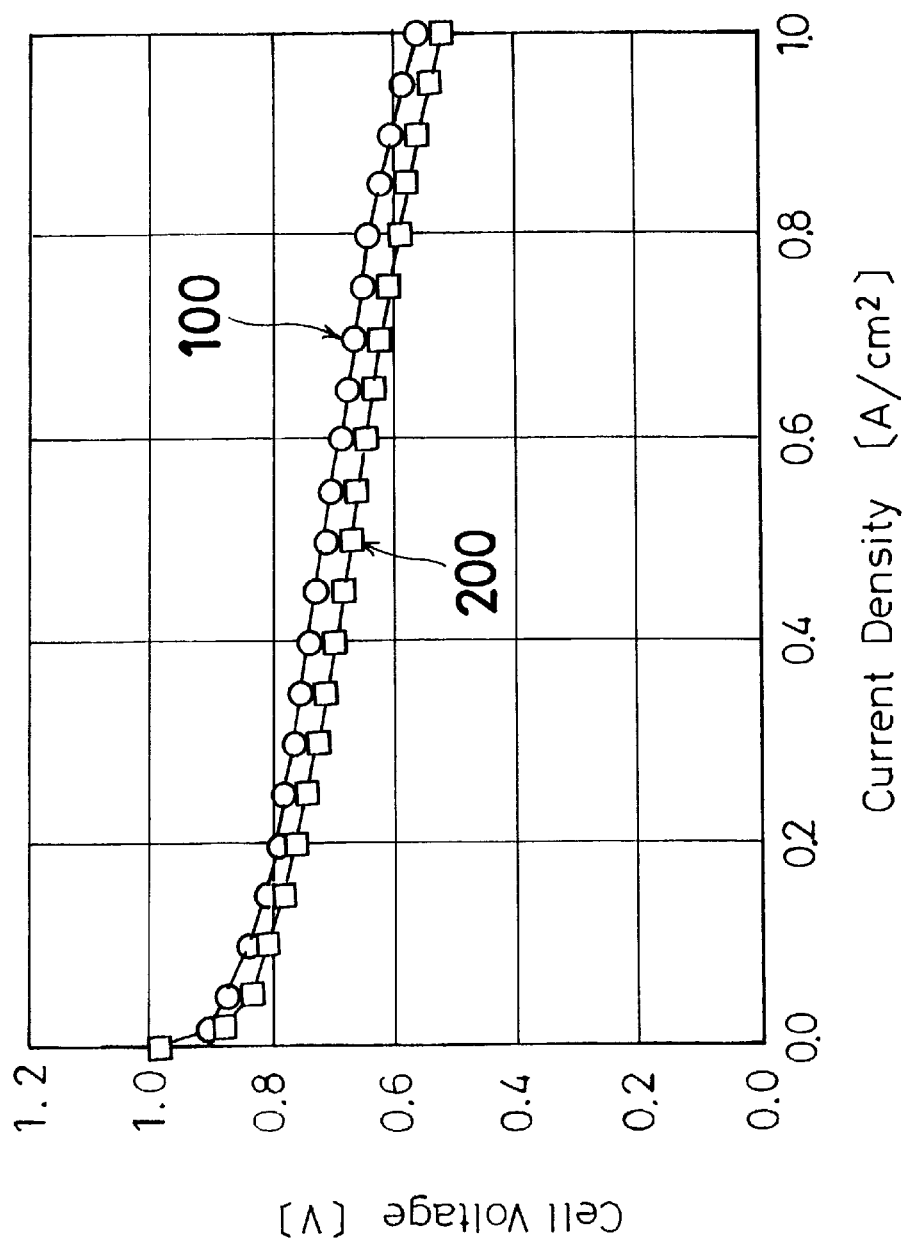
FIG. 7 is a graph showing test results of the third embodiment and the first embodiment.

In addition, instead of the concurrently baking and oxidizing the electrode substrate sheet, it may be hot pressed by sandwiching the electrode substrate sheet between a pair of male and female dies (not shown) at a pressure of 100 kg/cm² for 60 minutes in an ambient temperature of 390° C. The resulting MEA is shown in FIG. 6, wherein the oxygen electrode 1 and the fuel electrode 2 are formed with an air flow channel 1b and a hydrogen flow channel 2b, respectively. This MEA is compared with the device shown in FIG. 1 by a method similar to that in Evaluation Method 1. The results are shown in FIG. 7, which indicates that the characteristics (indicated by line 100) of the MEA of FIG. 6 are substantially identical to the characteristics of the MEA shown in FIG. 1 (which is indicated by the line 200).

In light of the fact that forming a channel in each of the separators is very expensive, forming the channel in the oxygen and fuel electrodes realizes a cost reduction in producing the membrane electrode assembly.

The invention has been shown and description with reference to specific embodiments. However, it should be understood that the invention is in no way limited to the details of the illustrated structures but changes and modifications may be made without departing from the scope of the appended claims.

What is claimed is:

1. A method for manufacturing a carbon sheet, comprising the steps of:
   forming a sheet by mixing carbon fibers and a bonding agent;
   drying the formed sheet;
   immersing the dried formed sheet in a water repellent material particle dispersed dilute solution;
   extracting the formed sheet from the water repellent material particle dispersed dilute solution;
   baking the formed sheet at a temperature below 500° C. for fixing water repellent material particles thereon contained in the water repellent material particle dispersed dilute solution; and
   oxidizing the bonding agent at a temperature below 500° C. for removing the same from the formed sheet during the baking step.

2. The method as set forth in claim 1, wherein the formed sheet contains a material capable of absorbing a dispersed medium of the water repellent material particle dispersed dilute solution.

3. The method as set forth in claim 2, wherein the material is the bonding agent.

4. The method as set forth in claim 1, wherein the step of forming the sheet further comprises mixing the bonding agent in fiber form with water and the carbon fibers to produce a slurry, and drying the slurry to form the sheet.

5. The method as set forth in claim 4, wherein the bonding agent is a pulp.

6. The method as set forth in claim 1, further comprising the step of facing the carbon sheet with a catalyst.

7. The method as set forth in claim 1, wherein the baking and the concurrent oxidizing steps are performed by hot pressing the formed sheet at a temperature below 500° C. so as to form a channel therein.

8. The method as set forth in claim 7, further comprising the step of facing the carbon sheet with a catalyst on a side thereof opposite the channel.

9. A method for manufacturing an electrode of a fuel cell, comprising the steps of:
   forming a sheet by mixing carbon fibers and a bonding agent;
   drying the formed sheet;
   immersing the dried formed sheet in a water repellent material particle dispersed dilute solution;
   extracting the formed sheet from the water repellent material particle dispersed dilute solution;

baking the formed sheet at a temperature below 500° C. for fixing water repellent material particles thereon contained in the water repellent material particle dispersed dilute solution;

oxidizing the bonding agent at a temperature below 500° C. for removing the same from the formed sheet during the baking step; and facing the formed sheet with a catalyst.

10. The method as set forth in claim 9, wherein the formed sheet contains a material capable of absorbing a dispersed medium of the water repellent material particle dispersed dilute solution.

11. The method as set forth in claim 10, wherein the material is the bonding agent.

12. The method as set forth in claim 9, wherein the step of forming the sheet further comprises mixing the bonding agent in fiber form with water and the carbon fibers to produce a slurry, and drying the slurry to form the sheet.

13. The method as set forth in claim 12, wherein the bonding agent is a pulp.

14. The method as set forth in claim 9, wherein the baking and the concurrent oxidizing steps are performed by hot pressing the formed sheet at a temperature below 500° C. so as to form a channel therein.

15. The method as set forth in claim 14, wherein the catalyst is provided on a side of the sheet opposite the channel.

* * * * *